United States Patent
Stöcker

(10) Patent No.: US 10,805,175 B2
(45) Date of Patent: Oct. 13, 2020

(54) SOFTWARE DEFINED NETWORKING SYSTEM

(71) Applicant: Carsten Stöcker, Hilden (DE)

(72) Inventor: Carsten Stöcker, Hilden (DE)

(73) Assignee: innogy Innovation GmbH, Essen (DE)

( * ) Notice: Subject to any disclaimer, the term of this patent is extended or adjusted under 35 U.S.C. 154(b) by 0 days.

(21) Appl. No.: 16/228,264

(22) Filed: Dec. 20, 2018

(65) Prior Publication Data
US 2019/0149429 A1    May 16, 2019

Related U.S. Application Data

(63) Continuation of application No. PCT/EP2016/064191, filed on Jun. 20, 2016.

(51) Int. Cl.
| | | |
|---|---|---|
| G06F 15/173 | (2006.01) | |
| H04L 12/24 | (2006.01) | |
| H04L 29/08 | (2006.01) | |
| H04L 29/06 | (2006.01) | |
| H04L 12/46 | (2006.01) | |

(52) U.S. Cl.
CPC .......... *H04L 41/20* (2013.01); *H04L 12/4625* (2013.01); *H04L 41/28* (2013.01); *H04L 63/101* (2013.01); *H04L 67/104* (2013.01); *H04L 67/1097* (2013.01)

(58) Field of Classification Search
None
See application file for complete search history.

(56) References Cited

U.S. PATENT DOCUMENTS

| | | | |
|---|---|---|---|
| 9,843,624 B1 * | 12/2017 | Taaghol | H04L 67/10 |
| 2013/0250770 A1 * | 9/2013 | Zou | H04L 47/19 370/238 |
| 2014/0325038 A1 * | 10/2014 | Kis | H04L 41/0803 709/220 |
| 2016/0099890 A1 * | 4/2016 | Kaufman | H04L 61/2575 709/203 |

(Continued)

FOREIGN PATENT DOCUMENTS

EP    2 933 979 A1    10/2015

OTHER PUBLICATIONS

Teemu Koponen et al., "Onix: A Distributed Control Platform for Large-scale Production Networks," Proceedings of the 9th USENIX conference on Operating systems design and implementation, Oct. 6, 2010, 14 pages.

(Continued)

*Primary Examiner* — Mohamed Ibrahim
(74) *Attorney, Agent, or Firm* — Reinhart Boerner Van Deuren P.C.

(57) ABSTRACT

The invention relates to a Communications system, in particular, a software defined networking communications system, comprising at least one network device comprising at least one data forwarding unit configured to forward at least one data packet, wherein the network device comprises at least one first peer-to-peer module, wherein the first peer-to-peer module is configured to communicate with at least one peer-to-peer application of at least one peer-to-peer network, wherein the peer-to-peer application comprises at least one controlling means configured to manage at least the network device.

12 Claims, 5 Drawing Sheets

(56) References Cited

U.S. PATENT DOCUMENTS

2019/0104026 A1* 4/2019 Zhang ................. H04L 41/145

OTHER PUBLICATIONS

Sasu Tarkoma, "Overlay and P2P Networks Applications continued and Summary," Lecture on Overlay and P2P Networks, Feb. 17, 2014, University of Helsinki, 30 pages.

Amin Tootoonchian et al., "HyperFlow: A Distributed Control Plane for OpenFlow," Proceedings of the 2010 Internet Network Management Conference on Research on Enterprise Networking; Apr. 27, 2010, USENIX Association, California, 6 pages.

* cited by examiner

SOFTWARE DEFINED NETWORKING SYSTEM

CROSS-REFERENCE TO RELATED PATENT APPLICATION

This patent application is a continuation of PCT/EP2016/064191, filed Jun. 20, 2016, the entire teachings and disclosure of which are incorporated herein by reference thereto.

FIELD

The invention relates to a system, in particular, a software defined networking system comprising at least one network device. The invention relates further to a method for managing a system, a peer-to-peer application of a peer-to-peer network and a network device.

BACKGROUND

Communications networks or communications systems, respectively, such as IP (Internet Protocol) based communication systems, are formed by a plurality of hardware network devices connectable via (wired or wireless) communication connections. Each network device comprises at least one data forwarding unit configured to forward data in accordance with a locally stored configuration data set. According to prior art systems, for managing such a communications system, it is necessary to manually configure each of the hardware processing devices e.g. by one or network administrator(s). For example, prior art communications networks require that a network device and processing device, respectively, must be configured by implementing address data, specific firewall rules, etc. In such a communications system it is usually not possible to connect a network device at another location of the communications system. The capabilities and attributes of a network device, such as logical groupings, access controls, quality of service (QoS), specific processing of data prior to forwarding said data, must be manually implemented in each of the plurality of hardware devices. Since communications system may comprise 1000 and more network devices there is a general concern to facilitate the managing of a communications system.

In order to avoid a manual configuration of hardware devices and to reduce the administration effort of such communications networks, in more modern communication networks, software-defined networking (SD N) and/or Network Function Virtualization (NFV) is/are used for managing the communications network. A reduction of required manual configurations of hardware devices of a communications network is, in particular, achieved by decoupling the control system and control plane, respectively, from the data system and data plane, respectively, of the communications system. SDN architectures decouple network control and forwarding functions, enabling network control to become directly programmable and the underlying infrastructure to be abstracted from applications and network services. The central control system formed by one or more server(s) is configured to decide where to send data and the data system is configured to forward the data to the desired point of destination. Software-defined networking provides a central controller for controlling the data traffic of a communications network without the need to manually configure the involved hardware devices.

Furthermore, NFV uses information technology (IT) virtualization technologies to virtualize e.g. entire classes of network entity functions into building blocks that may be connected together, to create communication services. VNF may comprise one or more virtual machine(s) running e.g. different software and/or processes on top of standard high-volume servers, switches and storage, or even cloud computing infrastructure, instead of having custom hardware appliances for each network function.

A prior art software-defined networking architecture and system, respectively, is shown in FIG. 1. The depicted system 100 comprises a control plane 102, a data plane 104 and an application plane 106. The control plane 102 comprises a central software-defined networking (SDN) controller 108. The data plane 104 comprises a plurality of (hardware) network devices 110. Two devices 110 are shown as an example. The application plane 106 comprises at least one SDN application 112, wherein two SDN applications 112 are shown as an example.

Furthermore, the communications system 100 includes one or more application-control-plane interface(s), also called northbound interfaces (NBIs) 128, between the SDN applications 112 and the central controller 108 and one or more control-data-plane interface(s) (CDPIs) 130 between the central controller 108 and the network devices 110.

The SDN controller 108 is a (logically) centralized entity 108 formed by one or more server(s). In order to communicate with the NBI driver units 114 of the SDN applications 112, the SDN controller 108 comprises at least one application agent unit 116 (also called NBI agent 116). Similarly, the SDN controller 108 comprises at least one data driver unit 118 (also called CDPI driver 118) configured to communicate with CDPI agents 120 of the network devices 110. Further, the SDN controller 108 comprises a control logic or unit 122. Also each SDN application 112 may comprise a control logic or unit 124.

Furthermore, each network device 110 comprises at least one data forwarding unit 126. A data forwarding unit 126 is configured to forward data packets in accordance with a configuration data set. For instance, one or more forwarding engine(s) may be implemented.

The advantage of a SDN communications system 100 compared to former communications systems is that configuration data, such as routing and/or security (e.g. firewall) rules, bandwidth allocations, is automatized and centralized by means of the central SDN controller 108. The decentral network devices 110 only conduct forwarding of data packets and e.g. additionally simple processing functions, wherein these functions can be configured and implemented by means of the central SDN controller 108.

However, a disadvantage of current SDN communications systems is the server-client structure of such systems. Usually, the at least one central controller is formed by one or more server(s) and the network devices are formed as clients. A disadvantage of server-client structures of this kind, particularly the server (or platform), apart from the high transaction costs, is that the central instance or central server manages confidential data. A persistent problem affecting the central instance is that of protecting the confidential data stored on one or more servers from access by unauthorized third parties. In particular, a high degree of security expenditure is required, in order to prevent configuration data, status data, etc. from being tampered with. This in turn leads to higher transaction costs.

A further disadvantage is the complex and costly infrastructure for providing the described server-client structure.

Therefore, the object of the present invention is to provide a system for managing the system which offers a high level of security in an easy manner.

BRIEF SUMMARY

The object is solved by a communications system, in particular, a SDN communications system, as disclosed herein. The communications system comprises at least one network device comprising at least one data forwarding unit configured to forward at least one data packet. The network device comprises at least one first peer-to-peer module. The first peer-to-peer module is configured to communicate with at least one peer-to-peer application of at least one peer-to-peer network. The peer-to-peer application comprises at least one controlling means configured to manage at least the network device.

In contrast to prior art communications system, the central controller, in particular, the at least one SDN controller is not formed by one or more server(s) but by means of a peer-to-peer application of a peer-to-peer network. In other words, a communication system according to the SDN architecture can be managed and controlled without a central instance. Thereby, the first peer-to-peer module is capable of communicating with the peer-to-peer application and peer-to-peer network, respectively. By the fact that instead of a central server or a platform, a peer-to-peer network (also called a framework) undertakes the, in particular, tamper-proof controlling of the system, in particular, the configuration of the system, by means of a peer-to-peer application, high security standards are achieved in that all computers (peer nodes or simply nodes) in the peer-to-peer network, at least a part of the peer computers in the peer-to-peer network, monitor(s) at least the accuracy of the controlling of the at least one network device. The transaction costs can be significantly reduced. No central, superior platform, server, cloud, etc. is required. The complexity of managing and controlling a communications system can be significantly reduced.

The communications system is, in particular, a communication system formed in accordance with a SDN architecture. In other words, the communications system (also called system) may be a SDN communications system. The system comprises on a data plane at least one (hardware) network device. Preferably, there is a plurality of network devices. Exemplified network devices may include gateways, routers, network bridges, modems, wireless access points, networking cables, line drivers, switches, hubs, and repeaters; and may also include hybrid network devices, such as multilayer switches, protocol converters, bridge routers, proxy servers, firewalls, network address translators, multiplexers, network interface controllers, wireless network interface controllers, ISDN terminal adapters load balancers, content filters, WAN accelerators, Network/WAN encryption, IP address management and other related hardware routers or network security devices, and the like.

A network device comprises at least one data forwarding unit. The data forwarding unit, such as a data forwarding engine, may be configured to forward data, in particular, data packets in accordance with a configuration data set. Forwarding data includes transmitting at least one data packet to at least one further network device via at least one wired and/or wireless communications connection.

Preferably, a network device may additionally comprise at least one data processing unit. The data processing unit may be configured to act on a data packet in accordance with a (further) configuration data set.

Furthermore, the system comprises at least one first peer-to-peer module. The peer-to-peer module is assigned to at least one network device. Preferably, each first peer-to-peer module is uniquely assigned to a respective network device. In other words, each network device can comprise a first peer-to-peer module. Preferably, the peer-to peer module is integrated in the (hardware) network device. It is also possible that a communication connection is provided between the network device and the peer-to-peer module assigned to the network device. This means that the peer-to-peer module can at least communicate and/or act on behalf of the network device. For example, the peer-to-peer module can be partly formed by a separate processing device, such as mobile communication device, or it can run on a remote processing device (e.g. in a data centre). In case of a remote processing device, the at least one network device may have a (secure) communication channel to the processing device of the data centre (or another server) and the processing device itself may have a connection to the peer-to-peer network. In an alternative or additional embodiment, the remote processing device may be a gateway to the peer-to-peer network. This means that the network device can securely communicate via its first peer-to-peer module and the gateway to the peer-to-peer network.

In comparison to a client server communications system in which a server provides a service and a client uses the service, these roles are cancelled in the present peer-to-peer network. Each participant (e.g. node) of the peer-to-peer network can use a service and the like and offer such a service. In particular, a peer-to-peer network is self-determined and/or self-organized (without any higher-level units). In the present case preferably each node and computer, respectively, of the peer-to-peer network comprises the peer-to-peer application. In particular, the first peer-to-peer module is configured to communicate, e.g. send messages to the peer-to-peer application and/or read data stored in the peer-to-peer application. The first peer-to-peer module may be a peer and node, respectively, of the peer-to-peer network.

The first peer-to-peer module is configured to communicate with the peer-to-peer application of the peer-to-peer network. By communicating with the peer-to-peer application the first peer-to-peer module and the respective network device may be controllable by the peer-to-peer application. In particular, the peer-to-peer application comprises at least one controlling means. The controlling means may be preferably formed by a (SDN) control smart contract comprising computer code and/or configuration data which can be capable of managing or controlling the at least one network unit, in particular, the data forwarding unit of the network device by means of the first peer-to-peer module of the network device.

The list of all (anonymised or pseudonymised) participants or entities of the at least one peer-to-peer network can preferably be made known to each participant, so in particular to each entity of the SDN system, as a peer-to-peer identification, e.g. in the form of a communications address. A mixer logic (i.e. mixing of identifications and using random identifications for a specific network device or user for its individual transactions) can be used to disguise user identifications of individual transactions to avoid analysis of movement profiles.

A peer-to-peer module can be at least partially formed by a software module and/or at least partially formed by a hardware module.

According to a first embodiment of the communications system according to the present invention, the controlling means may be configured to manage the network device by providing at least one configuration data set to the first peer-to-peer module of the network device. Preferably, a plurality of first peer-to-peer modules of respective network devices can be provided with (individual) configuration data sets. A configuration data set can preferably comprise at least one routing and/or switching parameter. In addition (or alternatively), a configuration data set can comprise security parameter(s), e.g. firewall rule(s), content filtering parameter (s) or the like, bandwidth allocation and/or load balancing parameter(s), VLAN configuration parameters and the like. A configuration data set may be an individual configuration data set for a specific network device or a general configuration data set for two or more network devices. An individual configuration data set can be provided with an identifier of the related network device and first peer-to-peer module, respectively.

In addition, user-related configuration data can describe security parameters of a user or a user group, e.g. Access Control Lists. The above mentioned configuration data for one or more specific network device(s) may select a set of or depend on user-related configuration data.

The at least one configuration data set can be provided by storing the configuration data set in the peer-to-peer application. The respective peer-to-peer module is configured to read out the configuration data set from the peer-to-peer application. Alternatively and/or additionally, the controlling means can cause transmitting one or more message(s) comprising the configuration data set to the at least one network device. Alternatively or additionally, the controlling means may be configured to initiate a transmitting of at least one broadcast updating message configured to update (selected) network device(s). In an embodiment the controlling means can send a peer-to-peer communication message to a network entity. This can be conducted automatically. The managing of a communications system can be further facilitated.

It shall be understood that the peer-to-peer application can configure the network in a way to give either configuration messages a high priority (e.g. QoS) or to provide a given bandwidth for configuration messages in order to ensure a short latency for those messages.

Preferably, the network device may comprise at least one data storage unit configured to store the provided configuration data set such that at least the data forwarding unit is operated in accordance with the stored configuration data set. In particular, the at least one configuration data set is locally storable in (each) network device. The at least one data forwarding unit of the network device, such as a data forwarding engine, may be capable to access the local storage unit in order to operate in accordance with the stored (data forwarding) configuration data set. The local storage unit may be an updatable storage unit. In particular, the controlling means can cause updating a stored configuration data set e.g. by providing an adapted configuration data set in order to reconfigure the at least one network device.

In the case the network device comprises also a data processing unit, according to a further embodiment of the present invention, the at least one data storage unit may be configured to store the provided (processing data) configuration data set such that at least the data processing unit is operated in accordance with the stored configuration data set.

Generally, the storage unit may be any suitable storage unit for storing configuration data in an updatable manner. In a preferred embodiment, the data storage unit may be formed by a protected software container and/or formed in a trusted execution environment. In such a system a trusted computing base (TCB) or Intel Software Guard Extensions (SGX) may protect secrets, such as the one or more configuration data set(s). Configuration data and other the software and/or data inside a secure enclave or container may be protected by hardware enforced access control policies. Configuration data set(s) can be securely stored in a memory of a protected software container and/or a trusted execution environment. The same or at least similar method for protecting configuration data can be applied for software code. With such a method software updates on network devices or any other entity of the communication system can be deployed and controlled in a secure way.

According to a further embodiment, the controlling means may be configured to receive at least one system status data set. The communications system may comprise at least one evaluating means configured to evaluate the received status data set. In particular, the controlling means can provide at least one received system status data set to the at least one evaluating means. The controlling means may be configured to manage at least the network device based on the evaluation result. By way of example, the at least one evaluating means can be implemented in form of a smart contract in the peer-to-peer application and/or by off-chain computation fully or partly orchestrated by a smart contract of the peer-to-peer application. The evaluating means can be configured to identify data traffic bottleneck(s) of the data traffic in the communications system. It shall be understood that an evaluating means may be configured for other tasks. In particular, based on at least one evaluation result at least one configuration data set for at least one network device may be adapted and/or messages maybe created (e.g. incident or system alert). For instance, the evaluating means and/or the controlling means can cause a respective adaption. The adapted configuration data set for the at least one network device can be provided to said network device by means of the first peer-to-peer module, as previously described. The overall performance of the communications system can be (automatically) improved.

The at least one system status data set may comprise at least one status data parameter of at least one network device and/or at least one log data parameter of at least one network device. For instance, the at least one network device may comprise at least one monitoring module configured to monitor at least one data flow, performance parameter(s) of a data forwarding unit and/or data processing unit or the like.

Preferably, the evaluating means may comprise at least one machine learning tool and/or at least one artificial intelligence tool for evaluating data. The evaluating means may be configured to evaluate the status data relating to an individual network device in order to improve the performance and/or or security of said network device. The evaluation process can comprise a comparison action with status data of similar network devices and/or status data and/or log data set(s). Alternatively or additionally, the evaluating means can evaluate a plurality of status data sets in order to analyse the SDN system performance or network performance and/or congestion management. Further, system security weakness can be analysed. Based on the one or more evaluation result(s) of the previously described evaluation processes, parameters of one or more configuration data set(s) can be adapted, in particular, optimized. For instance, a routing parameter, a switching parameter, a load balancing parameter or the like can be adapted. By analysing log data (which might be stored in a de-central file storage or database) and adapting network parameters a so called Security Information and Event Management (SIEM) system can be provided.

According to a preferred embodiment, the communications system may comprise at least one off-chain computation entity with at least one evaluating means. The controlling means may be configured to forward the received status data set to the evaluating means. An off-chain entity may be controllable by the peer-to-peer application, in particular, the controlling means. The off-chain entity is not part of the peer-to-peer application itself. Preferably, processing of data which requires a lot of processing power, such as evaluating a plurality of status data sets, can be done off-chain. Off-chain data processing, evaluating and/or validating can be managed by the peer-to-peer application, like the code of the controlling means on a block chain. In an embodiment the off-chain data processing entity can communicate directly with the network entities e.g. via signed peer-to-peer messages. Network entities and/or off-chain processing units may be registered in the peer-to-peer application, e.g. in a smart contract, to ensure proper authentication. The overall performance of the managing process can be increased. The peer-to-peer application may be connectable to two or more off-chain computing entities. By providing the same input data to the two or more off-chain computing entities and comparing the outputs, the peer-to-peer application can reduce dependency on the integrity of one central off-chain computing device.

What is more, the peer-to-peer application, in particular, the at least one controlling means of the peer-to-peer application, may be capable of dynamically allocating a plurality of evaluating means in order to optimise resource usage of evaluating means. It may also be capable to check if an evaluating means fulfils required performance or service levels, if it is over- or underutilised or if there are malfunctions or degradations. If this is the case the peer-to-peer application might be capable to reallocate or redistribute evaluating means (load balancing of evaluating means).

Furthermore, the system, in particular, a SDN system according to a further embodiment of the present invention, may comprise at least one software defined networking application. The software defined networking application may comprise at least one second peer-to-peer module. Alternatively, the at least one software defined networking application may be stored in the peer-to-peer application. It shall be understood that the present communications system may comprise both at least one software defined networking application stored in the peer-to-peer application and at least one software defined networking application comprising a second peer-to-peer module. A SDN application is, in particular, a software application program. Exemplified SDN applications are optimization applications (configured to e.g. optimize traffic flows to improve network performance and QoS), security applications (configured to extend and/or enforce security across the network/system), and the like. In order to provide a network requirement and system requirement, respectively, to the controlling means of the peer-to-peer application, an SDN application may comprise a second peer-to-peer module. The second peer-to-peer module may be configured to provide at least one network application requirement data set to the peer-to-peer application, in particular, to the controlling means. Alternatively, a SDN application can be formed as a smart contract and stored on the peer-to-peer application. In a particular secure manner, each SDN application can communicate with the at least one controlling means of the peer-to-peer application.

Further, at least one system status data set can be provided to a second peer-to-peer module by means of the peer-to-peer application. The controlling means can be configured to forward at least one system status data set comprising e.g. at least one of network status and network event. Based on the at least one system status data set a SDN application can determine its network requirement(s) and can create at least one network application requirement data set to be provided to the peer-to-peer application. The at least one controlling means of the peer-to-peer application may be configured to adapt at least one configuration data set based on the at least one network application requirement data set. The adaption of a configuration of a network device can be facilitated.

According to a preferred embodiment of the present invention, the communications system may comprise at least one distributed data storage configured to store at least the configuration data set. Preferably, the distributed data storage may be formed as a decentral file system or object storage (such as IPFS or storj) or decentral distributed database (such as BigchainDB) controlled by the peer-to-peer application, such as by a controlling means formed by a smart contract of the peer-to-peer application. The controlling means may be configured to access the distributed data storage for providing at least the configuration data set to the network device. A secure and powerful storage can be provided. Further data, such as system status data, evaluation results, and the like may be stored in the at least one distributed data storage.

In order to provide preferably each of the participants of the communications system, in particular, SDN communications system, such as every network device and/or SDN application, with a unique peer-to-peer identifier, according to a further embodiment, the peer-to-peer application may comprise at least one registration means configured to receive a registering message of a first peer-to-peer module of a network device and/or to receive a registering message of a second peer-to-peer module of a software defined networking application. The registration means may be configured to register the network device and/or the software defined networking application by storing a unique peer-to-peer identifier of the network device and/or by storing a unique peer-to-peer identifier of the software defined networking application.

An entity, such as a network device or an SDN application, can be registered in the peer-to-peer application as e.g. a so called smart asset. Each registered entity can be stored with its unique peer-to-peer identifier in a permission list. According to an embodiment of the system according to the present invention, at least one of a first and second peer-to-peer module of an entity may be configured to cause a registration of the entity (or peer-to-peer module) in the peer-to-peer application (or network) by transmitting a registering message comprising at least an identifier assigned to the entity and/or peer-to-peer module. The identifier might be already a peer-to-peer identifier or another identifier suitable to uniquely identify the entity. The (unique peer-to-peer) identifier may be a serial number or a smart asset hash of e.g. the entity, the user's name of the entity, a communication address of a network device, a Media Access Control (MAC) address, etc. If e.g. the identifier is not already a peer-to-peer identifier, e.g. if the identifier is a name of an application or network device, the peer-to-peer application, in particular, the registering means, may be configured to generate a unique peer-to-peer identifier for the respective entity (according to preset rule(s)). In particular, the registering means of the peer-to-peer application may register the respective entities by storing at least the peer-to-peer identification in the peer-to-peer application or a database controlled by the peer-to-peer application.

Prior to the registration of an entity, such as a network device or a SDN application, at least part of the peers of the peer-to-peer network may check whether the registering requirements (such as specific entity specifications or valid signatures or compliance requirements) predefined by the peer-to-peer network are met by the entity requesting registration. For instance, it may be necessary that a network device meets predefined technical specifications. In order to perform the check, preferably, further data may be included in the registering message.

In an embodiment, an SDN application and/or the peer-to-peer application may check if the network device is registered in a (another) peer-to-peer application that provides a 'digital product memory' for the network device. In the digital product memory data about the device can be stored, such as e.g. device master data, technical specifications and test/quality assurance data, maintenance data, usage data. In case the network device has a digital product memory the SDN application and/or the peer-to-peer application may validate the registration requirements via the data stored in the individual digital product memory.

In particular, the peers of the peer-to-peer network may provide registering rules or registering requirements which must be fulfilled by an entity to be regarded as a trustful entity. Rules/requirements may be individually defined by the peers of a peer-to-peer network. E.g. it may be necessary that a new entity must be recommended by an entity which is already a participant of the peer-to-peer network. In addition, it may be necessary that this participant must have a reputation factor which increases a predefined minimum reputation factor.

It may be possible that network device(s) can be pre-configured to provide its resources to the next SDN communication system and an automatic registration process will be started when a device is powered up and connected for the first time to a SDN communication system.

In a further embodiment a SDN communication system, e.g. caused by a user (e.g. owner) of the SDN communication system, may be configured to order at least one further network device. When the order is submitted, the network device (to be produced) may be registered in the peer-to-peer application with a unique identifier e.g. by the manufacturing device and/or manufacturer. The new network device may be pre-configured to join the (specific) SDN communication system and/or to accept (signed, encrypted) control messages from the (specific) SDN communication system. Alternatively or additionally, the SDN communication system may get root admin credentials via the registration process. Preferably as soon as the new network device is connected to SDN communication system the peer-to-peer application can deploy configuration parameters to the respective network device and can e.g. check the operational status. With the process described above standard root admin credentials can be avoided and a configuration process of a new asset can be automated.

Further, this method for registration and configuration can be applied to an asset as a whole that includes a network device. This means not only the networking functions may be configured, but the whole asset. Examples are computing devices, smart home appliances, infrastructure devices, measurement devices vehicles or medical devices. With this method these devices can be securely included into SDN communication networks. Another example is that a new asset can be automatically assigned to network parameters and/or security parameters (e.g. it can only be accessible for user(s) in a specific VLAN or permissions lists are deployed).

In an embodiment a new network device can be registered in a peer-to-peer application. Ownership can be transferred to a new owner at a later stage. During the transfer of the ownership the network device may be configured to join a specific SDN communication system and/or the current peer-to-peer application (securely) may transfer control and/or log-in credentials to the peer-to-peer application of the new owner and/or the new SDN communication system itself (without involving human interactions). Prior, during or after the transfer of ownership the peer-to-peer application can check the 'digital product memory' of a network device to check registration requirements. Positive check of these requirements might be a pre-requisite prior to transfer of ownership. This process can be understood as an automated device qualification process that can be run in advance.

According to a preferred embodiment, the peer-to-peer application may comprise at least one permission means configured to store at least one permission list. The permission means may be configured to store identifiers, permissions and/or accounts. Based on this data, a permission list can be created. The permission list may be e.g. an access control list (ACL), i.e. is a list of permissions attached to an entity. In particular, entities, such as SDN applications, can be given different access rights to different data sets and/or data processing units (of different network devices). Identifiers of registered entities can be used in the list. The security of a permission list can be increased by storing the list in the peer-to-peer application and by controlling the access to the list by preferably at least part of nodes and peers, respectively, of the peer-to-peer network. A configuration data set may preferably depend on the permission list.

Security can be further increased by linking a permission list to registered user(s), computing system(s) or machine(s) and using its/their identifier(s) in the peer-to-peer application (self-sovereign identifier, wallet or multi signature accounts). An identifier can include permission parameters (e.g. employee/asset of a company assigned to a specific department having a specific role having access to specific assets). Identity and Access Management (IDAM) information stored in the peer-to-peer application and signed by the company and/or department can be used to generate entries in a permission list for or to confirm access to network devices. Permission lists can be directly linked to user, computing system or machine identifier(s) in the peer-to-peer application. This further reduces manual interaction to generate and maintain permission lists.

Furthermore, according to another embodiment, the controlling means may be formed as a virtualization (computing and) network function controlling means configured to manage at least one network functions virtualization infrastructure. The network functions virtualization infrastructure may comprise at least one of:
computing hardware unit,
storage hardware unit,
network hardware,
virtual computing unit,
virtual storage unit, and
virtual network.

Network-function virtualization (NFV) is a network architecture concept that uses the technologies of virtualization to virtualize entire classes of network device functions into building blocks that may connect together to create communication services. A virtualized network function may comprise one or more virtual machine(s) running different software and processes. The managing and/or orchestration can be conducted in a similar way as described with respect to a SDN communications system. A hardware layer (plane) comprising hardware network devices (e.g. computing, storage, network) and the like is decoupled from the virtualization layer (e.g. virtual computing, virtual storage, virtual network and a virtualization layer). When a hardware (device) is registered in a peer-to-peer application to be used for infrastructure virtualization the peer-to-peer application may be configured to configure the hardware. The configuration process may include the deployment of a virtualization software. The same method(s) and tool(s) for registration, access management, requirements checking and configuration for (general) hardware devices can be applied as described hereinbefore for network devices.

The peer-to-peer application may also provide a controlling means (e.g. the previously described controlling means) configured to control the virtualized infrastructure and/or provided virtualized environment(s) and to provide access to these environments. These environments can be used for virtual machines for computing purposes. The peer-to-peer application controlling the virtualized infrastructure may, in particular, replace existing central infrastructure virtualization managers hosted in datacenter systems. Virtualized environment capacity built upon hardware excess capacity can be exchanged, traded or rented via the peer-to-peer application. Access management, configuration, monitoring and billing might be done via the peer-to-peer application. It shall be understood that the virtual machines can be used for secure multi-party processing.

Virtual machines for computing purposes can be used to host Virtualized Network Functions (VNF). The VNF may be controlled by the peer-to-peer application. The virtualization network function controlling means of the peer-to-peer application may be configured to manage one or more VNF running on one or more hardware devices. Examples for VNF are load balancer, firewall, WAN accelerator, deep packet inspection, proxy server, etc.

Furthermore, the communications system according to the present invention may be configured to provide a fog computing application. Fog computing or fog networking, also known as fogging or edge computing, is an architecture that uses one or a collaborative multitude of end-user devices or near-user edge devices to carry out a substantial amount of computing, storage or control activities. Delegation of computing tasks including data analytics or embedded device controlling tasks to one or more fog devices can be conducted by a controlling means configured as a fog computing controlling means of the peer-to-peer application. More particularly, the at least one fog computing controlling means of the peer-to-peer application is configured to control (orchestrate) peer-to-peer communication among two or more fog computing devices and/or with other Internet of Things (IoT) devices. IoT devices can be connected to a network device in form of a fog device which may run an IoT peer-to-peer application. IoT device(s) can be easily integrated with a IoT peer-to-peer application for use cases such as renting, sharing, controlling or data acquisition. In addition the fog device can be configured by the peer-to-peer application to conduct edge analytics of IoT data and control tasks. Configuration data sets for IoT control tasks can be e.g. provided by the peer-to-peer application and/or generated via off-chain analytics and/or machine learning. Improved or new control data sets may be deployed to the fog device for optimised IoT controlling purposes. Fog devices may be connected to a decentral file storage and decentral database for storage of acquired data and/or deployment and/or streaming of control data sets.

The same methods for registration, access management, requirements checking and configuration for fog hardware devices can be applied as described before. In particular, for the peer-to-peer communication peer-to-peer messaging and/or state channels can be used.

In addition, according to one variant of the present invention, the communications system of the present invention may be a meshed communications system and network, respectively. Examples are meshed mobile communication or car-to-car communication networks. A mesh network may comprise a network topology in which each network device is configured to relay data for the network. One or more (meshed) network devices may be connected to other network(s) such as the internet. All mesh network devices may cooperate in the distribution of data in the mesh system. Mesh networks can relay messages using e.g. a flooding technique and/or a routing technique. With routing, the message is propagated along a path by hopping from network device to network device until it reaches its destination. To ensure all its paths' availability, the network may allow for continuous connections and must reconfigure itself around broken paths, using self-healing algorithms, such as Shortest Path Bridging. Self-healing allows a routing-based network to operate when a network device breaks down or when a connection becomes unreliable. As a result, the network is typically quite reliable, as there is often more than one path between a source and a destination in the network. In addition to self-healing, off-chain optimisation algorithms can be run via the peer-to-peer application to optimise protocol and/or control parameters of the meshed network. Off-chain optimisation algorithms may use monitoring, log and status data stored in a decentral file storage or decentral database. Although mostly used in wireless situations, this concept can also apply to wired networks and to software interaction.

Preferably, configuration, routing, adaption and/or self-organisation protocol(s) may be deployed via the peer-to-peer application. The managing (orchestrating) of the mesh network devices may be conducted by a controlling means, in particular, a mesh controlling means, of the peer-to-peer application. New mesh network devices can be registered via the registering means of the peer-to-peer application as smart assets, as described hereinbefore. SDN, Security and/or NFV configurations can be managed via the at least one mesh controlling means of the peer-to-peer application. QoS may be deployed via the mesh controlling means of the peer-to-peer application as well (user(s) can contract QoS classes in e.g. a smart contract and can pay for higher QoS levels for e.g. unified communication use cases with a cryptocurrency). QoS may provide service level for latency and jitter which are important for real time communication. A network device can dynamically change the QoS requirements based on ad-hoc demand. QoS or bandwidth payments may be adjusted accordingly by means of the peer-to-peer application. The mesh system may provide an option to conducted routing via trusted network devices only (e.g. information from an identity system about trust relationships and/or an reputation system). Information exchange among mesh network devices e.g. about configuration, routing, state or status data can be conducted via state channels and/or peer-to-peer messaging. For instance, micro-payment charging for e.g. usage of the meshed network, usage of internet capacity or QoS levels can be conducted via the peer-to-peer application and/or payment channels.

According to a further variant, the communications system may be a cloud communications system. The cloud communications system may comprise at least one network device in form of a cloud network device. Cloud network devices can be a large public cloud, a small private cloud or a small device (e.g. a router) with access capacity.

According to an embodiment, a provider of a cloud communications system may go to a market place to offer cloud capacity in accordance to its individual requirements and installed network devices and machines. An evaluating device may be configured to calculate the available cloud capacity and offered prices based on parameters, such as individual energy costs and/or heating demand (in case of power to heat). A requestor may also got to the market place with general cloud processing requirements (e.g. for a virtual machine) or with concrete MPS (MultiProcessor Specification) requirements. In addition, the requestor may provide access to data on e.g. a file storage controlled by the peer-to per application and interfaces to external sources (e.g. IoT devices) or links to processing capacity to a smart and/or private contract or provide infrastructure set-up parameters (e.g. virtual machine). zk-SNARKs may be used to prove that the code execution is correct. Protected software container and zk-SNARKs may ensure correctness of virtual machine and access set-up (e.g. for machines). Preferably, all proofs may be published by means of a peer-to-peer application.

It shall be understood that the peer-to-peer application can comprise one or more controlling means. The controlling means can be configured for different, previously described, tasks.

According to a further preferred embodiment, the at least one peer-to-peer application can be a decentralized register or a shared database configured to store data, e.g. permission data, identifiers, log data, with given certain proofs or signatures. In addition to e.g. identifiers, the decentral register can store computer code acting as e.g. controlling means for controlling evaluating means, controlling network device(s), SDN applications and/or sending/receiving data. In particular, the code can be invoked by a transaction to the address of the code in so called 'smart contracts'. This code is processed on the node(s) of decentral register.

A decentralized register can be readable at least by a part of the participants of to peer-to-peer network. In particular, every computer node, network device and/or SDN application e.g. including at least one peer-to-peer module can comprise the peer-to-peer application. The decentralized register, at least the public part (i.e. may be without private contracts) of the decentralized register, may be read at least by each participant of the peer-to-peer network. In particular, all peer-to-peer modules and all other computers of the peer-to-peer network can preferably read all information in the peer-to-peer application formed as a register. Preference is also that all peer-to-peer modules and all other computers of the peer-to-peer network can send messages to or write messages to the peer-to-peer application. A message or transaction sent to a smart contract may start the execution of a code of the smart contract while using data stored in the smart contract. For instance, sending status data to a controlling means may start the execution of the code resulting in e.g. forwarding the data to an evaluating means, controlling said evaluating means and adapting at least one configuration data set depending on the evaluating result.

The peer-to-peer application can be built upon the following elements: peer-to-peer network, Consensus System/ Protocol, Data Structure, Merkle Trees, Public Key Signatures, Byzantine Fault Tolerance. It may replicate data based on a consensus principle. It may be auditable and traceable.

In a simple way information can be made available to preferably all participants. This may allow to carry out a review of the information stored in the decentral register or the code executed in the decentral register. Particularly preferably, each computer in the peer-to-peer network can be configured to review new information, in particular, based on older information stored in the peer-to-peer application.

In addition, the at least one controlling means is monitored by at least a part of the nodes of the peer-to-peer network, preferably by all nodes. A manipulation of a controlling means can thus be prevented, at least detected.

Moreover, preferably each computer can in each case comprise the complete data content, but include at least a portion of the data contents of the peer-to-peer application, in particular of the decentral register. For example, it may be provided that after a positive verification of written information in the peer-to-peer application this information is saved by all computers, at least by a part of the computers. The tamper resistance of the data stored in the peer-to-peer application can thereby be further improved. An evaluating process or configuration process can be securely controlled.

In order to store new information in a tamper-proof way, the peer-to-peer application can comprise encryption means and/or signature means and/or verification means, wherein at least one of the encryption means and/or signature means and/or verification means is configured to store data, such as a permission list and/or peer-to-peer identifiers, evaluation result(s), configuration data, etc. In particular, it can be provided that by the hash function a link is established with at least one previously stored information in the decentral register. Further data, such as request messages, ordinary, contextual and/or transaction data of an entity, such as a network device, can be stored.

The peer-to-peer application may be formed by a Directed Acyclic Graph (DAG). A directed acyclic graph, such as IOTA or Tangle, means that blocks (or nodes of the graph) are coupled to each other via directed edges. Thereby, direct means that the (all) edges have (always) a same direction similar to time. In other words, it is not possible to step back. Eventually, acyclic means that loops do not exist.

In a particularly preferred embodiment of the present system, the peer-to-peer application can be a block chain or decentral ledger comprising at least two blocks coupled to each other (e.g. Ethereum Block chain with Smart Contracts). The block chain technology or "decentral ledger technology" is already used in the payment by means of a crypto currency, such as Bitcoin. It has been recognized that by a particular configuration of a block chain, at least the correctness of a received or provided data and of conducted processes, such as an configuration, controlling and/or evaluating process, can be checked without the need of a central server. A SDN controller can be easily implemented as a SDN controlling means in a block chain. A SDN system can be managed in an easy manner.

In addition, the block chain can be used to generate predefined action(s) caused by at least one peer-to-peer module and/or an evaluation result in a tamper-proof manner. The block chain according to the present embodiment is particularly a decentralized, peer-to-peer-based register in which all data related to at least one configuration process can be logged. A block chain is particularly suitable as a technical means to replace a central entity/server in a simple and secure manner.

In alternative embodiments of the peer-to-peer application, the block chain can be a permissionless or permissioned block chain. In a specific case the block chain can be public, consortium or private block chain.

In a further embodiment, the peer-to-peer application can be formed by multiple block chains which are connected via mechanisms, such as side chains or smart contracts. A peer-to-peer node can run one or more different block chain clients.

Data of the peer-to-peer application can be stored on the "decentral ledger technology" and/or the decentral ledger steers (encrypted) data storage accessible via the internet and preferably in de-central data storage, object store and database, respectively, such as Interplanetary File System (IPFS) or storj or in a distributed Blockchain database (e.g. BigChainDB). Access to the encrypted data to third party entities is managed via the permission means formed as one or more smart contract(s) on the block chain.

In addition, data feeds can be provided by the peer-to-peer application (so called "smart oracles"). Data can be captured from trusted sources off-chain and stored on the block chain or stored via the block chain on a decentral data storage entity.

Information among peer-nodes can be exchanged by a peer-to-peer messaging system. This means a peer node can send a message to another peer node to submit an information or to trigger an action. Messages can be clear text, signed, hashed, time-stamped and/or encrypted. This means that not all data exchanged among peer nodes must be stored on the block chain.

In a further embodiment, the at least one peer-to-peer network can be formed by a plurality of computer nodes and a peer-to-peer module, such as the first peer-to-peer module of a network device, the second peer-to-peer module of a SDN application, etc., is only configured to communicate with the plurality of computer nodes. In other words, the peer-to-peer module is not a computer node of the peer-to-peer network but only a participant. Such a peer-to-peer module does not comprise the peer-to-peer application but only provides an interface module, such as an application programming interface (API), and a decentral application for communication with the computer nodes of the peer-to-peer network or the peer-to-peer application, such as a block chain or a smart contract on the block chain. For instance, such a peer-to-peer module can either send clear text or encrypted information or generate a (secure) connection (e.g. tunnel) to a peer-to-peer gateway (or so called "remote node") in order to communicate with the peer-to-peer network. This allows reducing the required processing power of the peer-to-peer module.

In one implementation of the peer-to-peer network, there can be only one validating peer or full node, e.g. only one node can be configured to perform a validation process, and one or more observing (or monitoring) nodes. An observing node can validate transactions to establish a trust level but does not validate all transactions which is done by the validating peer.

In an alternative embodiment, the peer-to-peer module is one of the computer nodes. In this case the peer-to-peer module comprises at least a part of the peer-to-peer application. In particular, the peer-to-peer module can comprise preferably the total data content of the peer-to-peer application or can access the information stored in another node. For instance, the peer-to-peer module might be a so called "light node" or a decentral application (DAPP) connected to a remote node.

It is noted that in the present case, according to an embodiment, the peer-to-peer module comprises at least an API configured to communicate with the peer-to-peer application, such as the block chain. In addition to the API, the peer-to-peer module comprises a decentral application of software comprising local algorithms at least configured to create and transmit data, such as system status data, to the peer-to-peer application via the API. The decentral application so called "Dapp" is at least configured to process and transmit the meter data.

Preferably, the data is signed or encrypted or can be transmitted via a cryptographically secured tunnel or a secured internet connection to a peer-to-peer node running the peer-to-peer application, such as the block chain. In another particular embodiment, also the peer-to-peer application itself is implemented in the peer-to-peer module, i.e. the peer-to-peer module is a node of the peer-to-peer network comprising the decentral application, the API and the peer-to-peer application, such as the block chain or decentral ledger.

Data and transactions stored on the block chain do not provide "transactional privacy". Transactions between pseudonyms may be (often) stored in clear text on the block chain. In some cases data stored on the block chain are encrypted and the keys may be handled via the block chain. Transactions between pseudonyms are stored in clear text on the block chain. Privacy preserving, secure transactions or execution of computer code can be achieved with cryptographic tools, such as zero knowledge (zk) proofs or zk Succinct Non-interactive Arguments (zk-SNARK). Transactions or algorithms are separated into two parts: a smart contract on the block chain and a private contract. A privacy preserving protocol ensures the privacy of data and the correctness of code execution (SNARK verification is done via the smart contract on chain). The private contract computation can be done by a set of nodes, off-chain computers or done in measured launch environment or a secure hardware enclave for attestation and sealing that cannot be manipulated by other software code running on the devices. In an alternative embodiment, secure Multi-Party-Computing (sMPC) systems can be used for transactional privacy. Examples for privacy preserving protocols and computation are HAWK and MIT Enigma.

With zero knowledge proof (zk Proofs) the parties can see that the algorithm is executed correctly in a private contract, but the input data are not disclosed to the party. In addition, selective privacy can be achieved by sharing keys to decrypt transactions for reporting and auditing purposes.

Similarly, in an alternative (not shown) embodiment, a particularly large peer-to-peer network may be divided in two or more (physical or logical or dynamically virtual) clusters. In a corresponding peer-to-peer network, for example, a validation (of a subset of transactions) may only be carried out by the members of one cluster (a subset of nodes; e.g. sharding of a block chain to improve the scalability). In a further embodiment the peer-to-peer application can be formed using multiple block chains. These block chains are connected via frameworks such as sidechains or smart contracts.

Financial values can be (instantaneously) exchanged with a transaction via a cryptocurrency. In an alternative or additional embodiment, micropayment channels are used for a constant payment stream that can be handled party off-chain to reduce the amount of on-chain transactions. In a further embodiment, so called state channels or state networks (e.g. Raiden Network) or a decentral database (e.g. BigchainDB) may be used to exchange digital tokens off-chain in a secure way. Opening and/or closing of state channels may be registered on the block chain. This means that individual transactions may not be stored on the block chain in order to improve scalability and avoid movement tracking of pseudonyms on the block chain. According to the present invention, a man-in-the-middle is not necessary. Fully automated processes from authentication to charging and billing can be provided.

A further aspect of the present invention is a method for managing a communications system, in particular, a software defined networking communications system, wherein the system comprises at least one network device comprising at least one data forwarding unit configured to forward at least one data packet, at least one peer-to-peer application of at least one peer-to-peer network, wherein at least one first peer-to-peer module comprised by the network device is configured to communicate with at least one peer-to-peer application of at least one peer-to-peer network, the method comprising managing at least the data forwarding unit by means of a controlling means of the peer-to-peer application via the first peer-to-peer module.

The method can be, in particular, used for operating a previously described communications system, such as the software defined networking communications system. Preferably, managing at least the data forwarding unit of the at least one network device by means of a controlling means of the peer-to-peer application via the first peer-to-peer module includes providing by the controlling means at least one configuration data set to the at least one network device and e.g. operating at least the data forwarding unit in accordance with the provided configuration data set.

A further aspect of the present invention is a peer-to-peer application of at least one peer-to-peer network comprising at least one controlling means configured to manage at least one data forwarding unit of at least one network device via a first peer-to-peer module of the network device. The peer-to-peer application maybe, in particular, a block chain. The controlling means may be formed as a smart contract comprising code configured to manage at least one data forwarding unit of at least one network device. The smart contract may, in particular, comprise code configured to provide at least one configuration data set to the at least one network device. The code may be executed on at least one node of the peer-to-peer network.

A still further aspect of the present invention is a network device of a communications system, in particular, a previously described communications system. The network device comprises at least one data forwarding unit configured to forward at least one data packet. The network device comprises at least one first peer-to-peer module configured to communicate with at least one peer-to-peer application of at least one peer-to-peer network. At least the data forwarding unit is manageable by means of a controlling means of the peer-to-peer application via the first peer-to-peer module.

The features of the methods, systems, modules, peer-to-peer applications, network devices and computer programs can be freely combined with one another. In particular, features of the description and/or the dependent claims, even when the features of the dependent claims are completely or partially avoided, may be independently inventive in isolation or freely combinable with one another.

These and other aspects of the present patent application become apparent from and will be elucidated with reference to the following figures. The features of the present application and of its exemplary embodiments as presented above are understood to be disclosed also in all possible combinations with each other.

BRIEF DESCRIPTION OF THE DRAWINGS

In the figures show.

DETAILED DESCRIPTION

Figure 1:
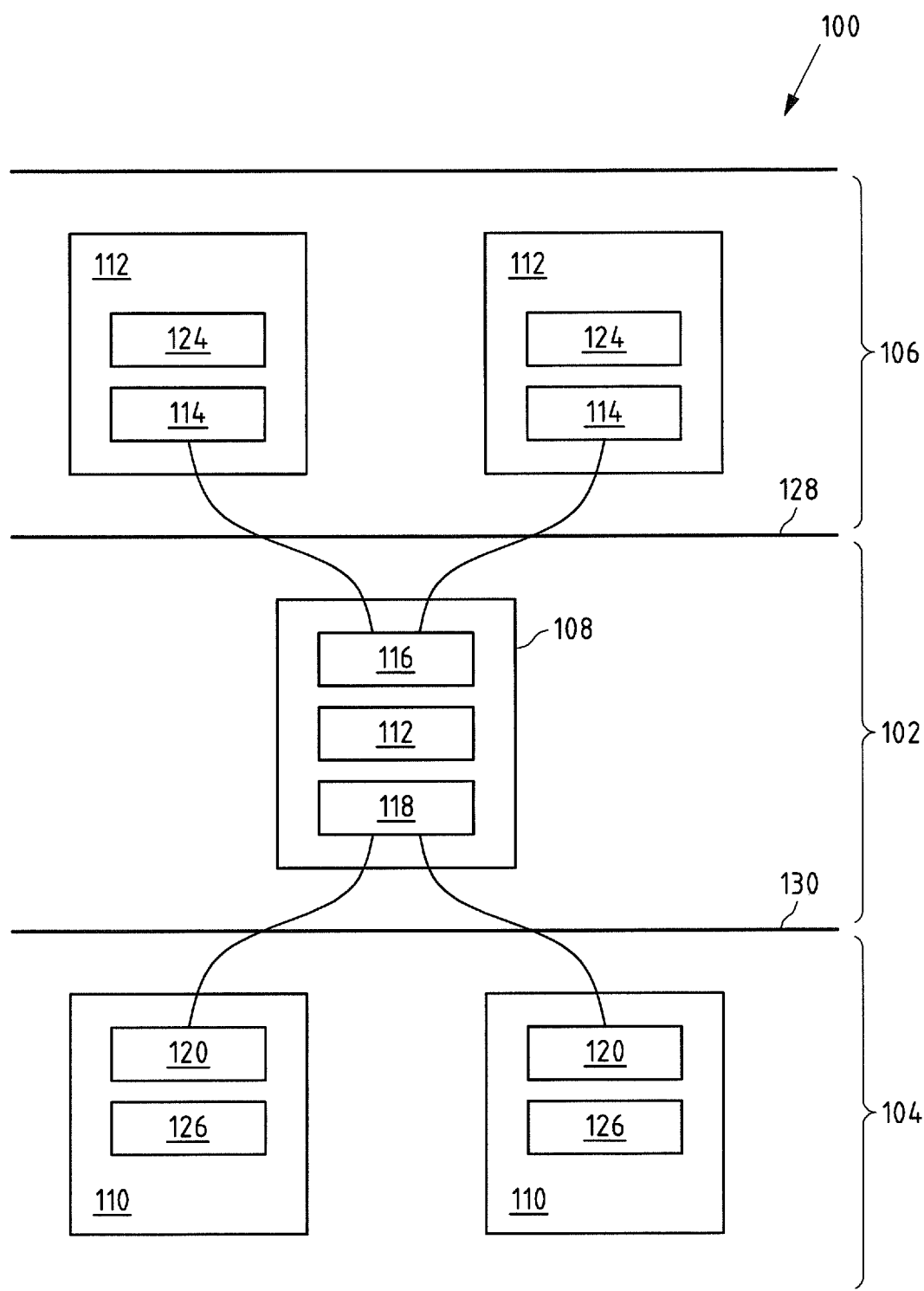
FIG. 1 shows a schematic overview about a prior art software-defined networking architecture.

Like reference numerals in different figures indicate like elements.

Figure 2:
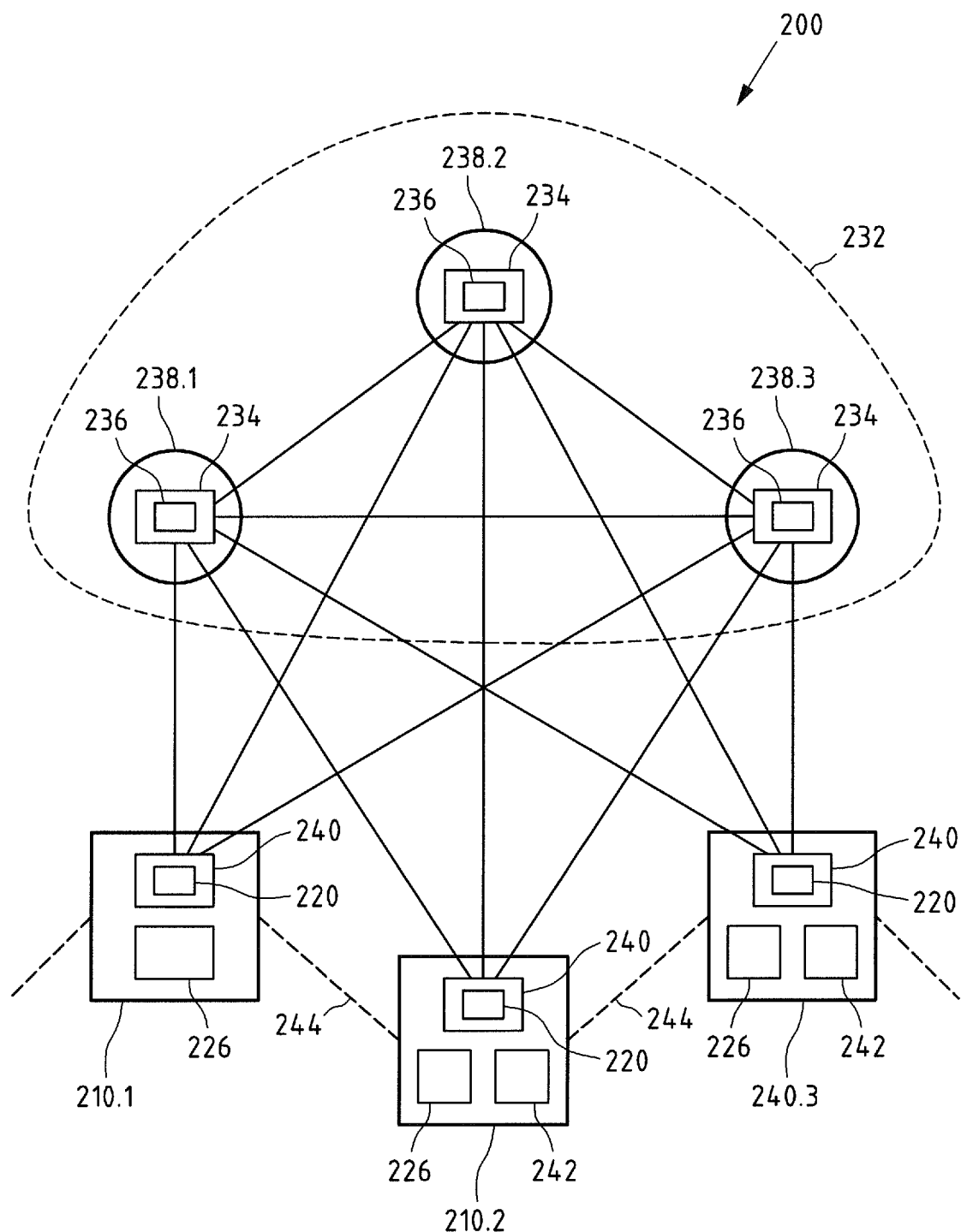
FIG. 2 shows a schematic view of a first embodiment of a system according to the present invention.

FIG. 2 shows a schematic view of an embodiment of a communications system 200, in particular, a SDN communications system 200 according to the present invention. The system 200 comprises at least one network device 210.1, 210.2, 210.3. In the present example, three exemplified network devices 210.1, 210.2, 210.3 are shown. Usually, a communications system may comprise a plurality of network devices.

Each of the network devices 210.1, 210.2, 210.3, e.g. a router and/or a switch, comprises at least one data forwarding unit 226. For instance, forwarding engines configured to forward data packets via communications connections 244 to at least one further network device 210.1, 210.2, 210.3 can be implemented. In particular, the data forwarding unit may be configured to forward a data packet in dependence of at least one (data forwarding) configuration data set e.g. comprising routing or switching configuration data. It shall be understood that there may be more or less communications connections.

In addition, the network devices 210.2 and 210.3 comprise a data processing unit 242. It shall be understood that a network device may comprise two or more data processing units. A data processing unit 242 is configured to act on at least one data packet (prior to forwarding said data packet). Thereby, a data processing unit is configured to process at least one data packet in accordance with at least one (data processing) configuration data set. Exemplified data processing units are network processing boards, computer chips, ASICs, GPUs, embedded controller or trusted execution environments.

A substantial difference compared with prior art systems, such as system 100 according to FIG. 1, is that no central instance and/or third party organization is provided. In the present case the system 200 comprises a peer-to-peer network 232 or a computer-computer network 232. The peer-to-peer network 232 comprises a plurality of nodes 238.1, 238.2, 238.3 or computers 238.1, 238.2, 238.3. A peer-to-peer network 232 is characterized in the present case in that each node 238.1, 238.2, 238.3 and/or participant 240 is preferably connectable at least to every other node 238.1, 238.2, 238.3 and/or participant 240. For instance, at least one physical standard network (wired and/or wireless) can be used for connection. For communicating via the at least one physical standard network suitable transceiver modules may be arranged in the respective entities.

In addition, the computers 238.1, 238.2, 238.3 have equal rights, something which distinguishes them from a server-client structure.

The depicted nodes 238.1, 238.2, 238.3 (each) comprise a peer-to-peer application 234. As can be seen from FIG. 2, the same peer-to-peer application 234 is preferably implemented on each node 238.1, 238.2, 238.3. The peer-to-peer application 234 may preferably be a public register 234 that can, in particular, be inspected by all participants 238.1, 238.2, 238.3, 240 (not only the nodes 238.1, 238.2, 238.3) of the peer-to-peer network 232. Each node 238.1, 238.2, 238.3 preferably has the (entire) public register 234. It may also be envisaged that only part of the register can be provided on a node (light node). In a particularly preferred embodiment, the peer-to-peer application 234 may be a block chain 234 which will be explained in more details hereinafter. It shall be understood that the peer-to-peer network may comprise further nodes. In addition, it shall be understood that also a network device can be formed as a node of the peer-to-peer network.

The peer-to-peer application 234 comprises at least one controlling means 236, in particular, a SDN controlling means 236. The SDN controlling means 236 is configured to manage at least the network devices 210.1, 210.2, 210.3. In particular, by means of the peer-to-peer application 234, the controlling means can at least provide one or more configuration data sets to the network devices 210.1, 210.2, 210.3 in order to operate the respective data forwarding units 226 in accordance with at least one configuration data set.

More particularly, each depicted network device 210.1, 210.2, 210.3 comprises at least one first peer-to-peer module 240. A CDPI agent 220 may be preferably implemented in each first peer-to-peer module 240.

A peer-to-peer module 240 is (generally) configured to communicate at least with the peer-to-peer network 232, i.e. the nodes 238.1, 238.2, 238.3 of the peer-to-peer network 232. In other words, the peer-to-peer module 240 or the network device 210.1, 210.2, 210.3 corresponding or assigned to the respective first peer-to-peer module 240 is at least a participant of the peer-to-peer network 232. Preferably, all participants 238.1, 238.2, 238.3, 240 (including all nodes) of the peer-to-peer network 232 are known to each participant 238.1, 238.2, 238.3, 240 of the peer-to-peer network 232.

In the present case the at least one first peer-to-peer module 240 is not a node of the peer-to-peer network 232 but only a participant 228.1. While the nodes 238.1, 238.2, 238.3 or computers 238.1, 238.2, 238.3 in the peer-to-peer network 232 comprise at least a part of the peer-to-peer application 234, a participant of a peer-to-peer network 232, like the present peer-to-peer module 240, does not comprise the peer-to-peer application 234. Such a peer-to-peer module 240 is configured to provide (only) access to the peer-to-peer application 234 e.g. via an API (application programming interface). Each peer-to-peer module 240 (also a node or light node) may comprise a decentral application and at least an API. In the case the peer-to-peer module is formed as a node of the peer-to-peer network, the peer-to-peer module (also) comprises at least partly the peer-to-peer application 234. It shall be understood that a first peer-to-peer module 240 might be a node of the peer-to-peer network.

The first peer-to-peer module 240 may comprise a communication connection to the data forwarding unit 226 and/or the data processing unit 242. The data forwarding unit 226 may be configured to forward one or more data packets under the control of the SDN controlling means 236. In particular, by means of the peer-to-peer application 234 the behavior of a data forwarding unit 226 can be controlled and managed by the controlling means 236. For instance, the controlling means 236 can provide a general or one or more individual configuration data set(s) to the network devices 210.1, 210.2, 210.3. By way of example, respective data sets can be stored in the public peer-to-peer application 234. Each network device 210.1, 210.2, 210.3 can inspect and read out, respectively, the configuration data set assigned to the respective network device 210.1, 210.2, 210.3 using its peer-to-peer module 240. Alternatively or additionally, a configuration data set message can be transmitted to a network device 210.1, 210.2, 210.3. Such a message can be received by the first peer-to-peer module 240. The controlling means may be configured to cause storing and/or transmitting of the at least one configuration data set.

In a similar way, configuration data set(s) for a processing unit 242 can be provided to the respective network devices 210.1, 210.2, 210.3. In an easy and secure manner, a SDN communications system 200 can be managed by means of a peer-to-peer application 234 and peer-to-peer network 232, respectively.

Figure 3:
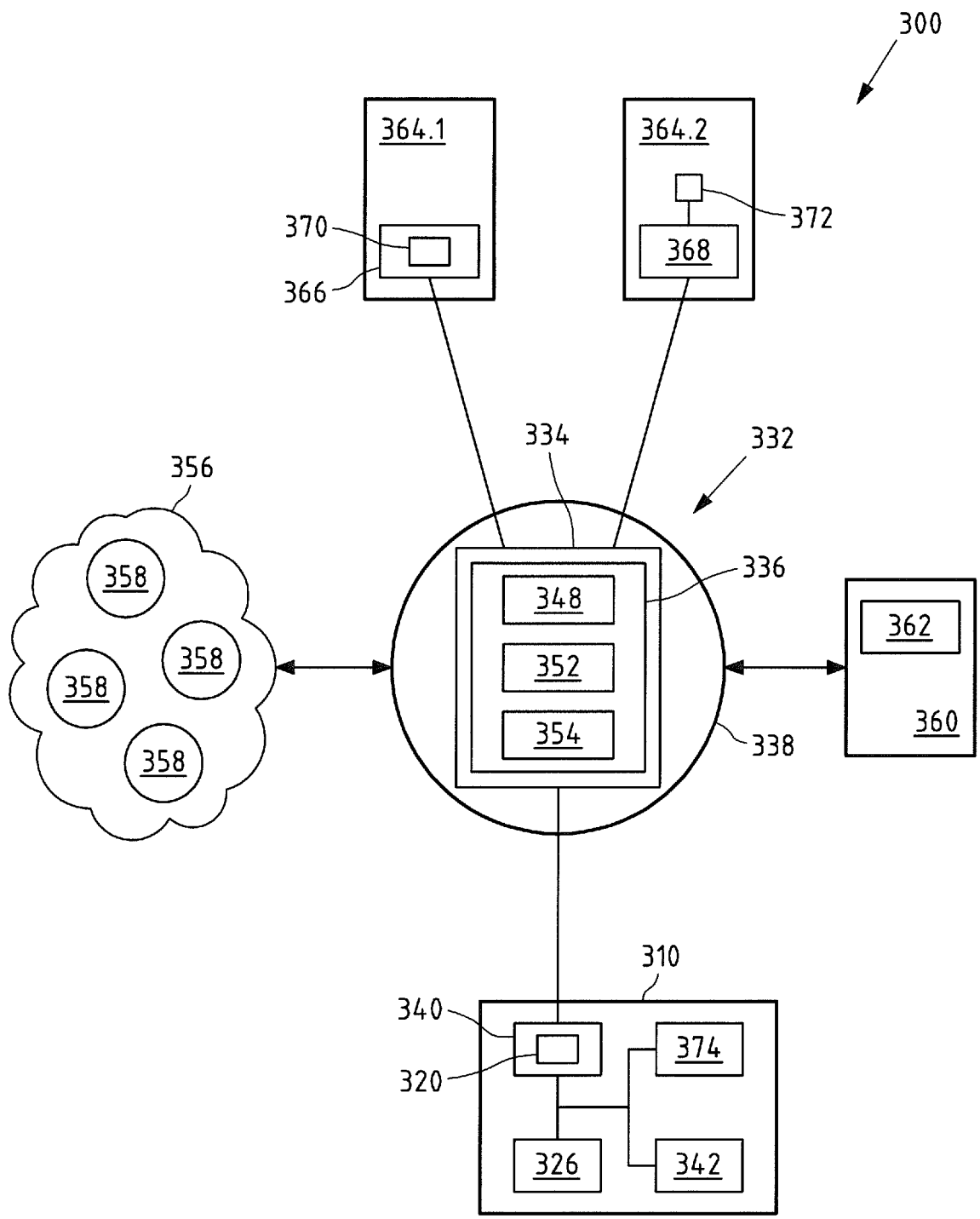
FIG. 3 shows a schematic view of a further embodiment of a system according to the present invention.

FIG. 3 shows a schematic view of a further, more specific, embodiment of a communications system 300 of the present invention. Only for the sake of clarity the peer-to-peer network 332 comprises merely one node 338 and merely one network device 310. In general, there may be a plurality of nodes and/or network devices.

The at least one controlling means 336 of the peer-to-peer application 334 comprises one or more NBI agent(s) 348, at least one SDN logic unit 352 and one or more CDPI driver(s) 354.

Furthermore, the controlling means 336 is configured to access at least one data storage 356, in particular, a distributed data storage 356 comprising a plurality of distributed data storages 358. Preferably, the database 356 maybe formed as a decentral file system (such as IPFS, storej) or decentral distributed database (such as BigchainDB) controlled by the peer-to-peer application 334 and controlling means 336, respectively, such as by a controlling smart contract 336 of the peer-to-peer application 334.

The distributed data storage 356 is configured to store e.g. one or more configuration data set(s), such as data forwarding configuration data set(s) and/or data processing configuration data set(s). In addition, system status data set(s), device status data set(s), log data set(s) and/or event data set(s) can be stored in the distributed data storage 356.

For instance, a network device 310 may comprise one or more (not shown) monitoring module(s) configured to monitor one or more parameter(s) e.g. relevant for the data transfer, such as QoS, transmission failures, etc. The network device 310 may provide system status parameter(s) to the peer-to-peer application 334 via its peer-to-peer module 340. There may be further monitoring modules in the communications system 300 each configured to monitor one or more system parameter(s), such as transmission quality parameters, and configured to transmit said monitored parameter(s) to the peer-to-peer application 334. In addition, permission data set(s), such as one or more access control lists, can be stored in the distributed data storage 356.

The depicted communications system 300 comprises at least one off-chain computation entity 360 having at least one evaluating means 362. It shall be understood that there may be a plurality of evaluating means e.g. configured for one or more (different) tasks.

For instance, the controlling means 336 may be configured to transmit one or more system status data set(s) to at least one (off-chain and/or fog) evaluating means 362 or the evaluating means 362 may read data in a decentral file, object store, database that were written by the controlling means 336. The evaluating means 362 may be configured to evaluate the one or more status data set(s) and to provide an evaluation result to the controlling means 336 and/or to the peer-to-peer application 334. Based on the evaluation result, which may be stored in the peer-to-peer application 334 and which may be validated by at least a part of the peer-to-peer nodes 338, the controlling means 336 (or another means of the peer-to-peer application 334) may adapt at least one configuration data set in order to optimize e.g. the performance and/or security of one or more individual device(s) of the SDN network 300 or OF the (total) SDN network 300 and system 300, respectively. It shall be understood that one or more evaluating means may also be configured at least in part as a smart contract implemented on the peer-to-peer application 334. The controlling means may detect an adapted configuration data set stored e.g. in the distributed data storage 356 and may provide said adapted configuration data set to at least one network device 310.

It shall be understood that there may be several evaluating means 362 in one or more communication systems. These evaluating means can be registered in a peer-to-peer application (e.g. overlay peer-to-peer network) in order to enable secure interactions. This interaction may be useful if one evaluating means does identify a poor performance pattern or a security attack pattern (e.g. log data patterns for APTs) and e.g. corrective actions may be needed. This pattern and corrective actions can be exchanged with other evaluating means. In the case other evaluating means identify similar patterns these evaluating means can trigger corrective actions. A reputation system may be introduced to assess performance of individual evaluating means including quality of patterns and corrective actions. A verification and/or consensus algorithms can be introduced to qualify patterns and corrective actions prior to implementation by other evaluating means.

In addition, an off-chain computation entity may comprise one or more machine learning module(s) and/or one or more artificial intelligence module(s) in order to analyze e.g. of individual device status, configurations and utilization, network performance, congestion management, network security weakness, automated penetration of network security weaknesses, optimize of switching, routing and/or load balancing parameters, identify pattern(s) of vulnerabilities and/or attacks and/or hackers, identify Advanced Persistent Threats (APTs) and/or calls, monitor policy and SLA, identify log patterns for APTs that can be shared to stop the APT (e.g. block users log in attempts by blocking them in a ACL or Firewall) and/or to identify anti-virus and/or content filtering patterns. It shall be understood that also the peer-to-peer application may comprise means for conducting one or more of the above processes.

The network device 310 may comprise at least one local storage 374 configured to e.g. store one or more configuration data set(s). The local storage 374 may be formed as a protected software container (and/or or a trusted execution environment) 374. The data forwarding means 326 may be configured to access the local storage 374, e.g. for reading a data forwarding configuration data set. Then, the data forwarding means 326 may forward one or more data packet(s) in accordance with said data forwarding configuration data set.

The at least one data processing unit 342 may also be configured to access the local storage 374, e.g. a data processing configuration data set, in order process at least one data set in accordance with the stored configuration data. The local storage 374 may be updatable. In the case the controlling means 336 provides an adapted configuration data set to said network device 310 the first peer-to-peer module 340 may cause an respective adaption of the stored configuration data set.

Furthermore, the depicted communications system 300 comprises at least one SDN application 364.1, 364.2. Each of the depicted two SDN applications 364.1, 364.2 comprises a second peer-to-peer module 366, 368, wherein the second peer-to-peer module 366 comprises a NBI driver 370. The second peer-to-peer module 368 is formed as a peer-to-peer gateway and is at least connectable with a NBI driver 372.

The second peer-to-peer module 366, 368 is also configured to communicate with the peer-to-peer application 334, in particular, the controlling means 336 of the peer-to-peer application 334. For instance, by means of the second peer-to-peer module 366, 368 a SDN application 364.1, 364.2 can receive information about the system status or system events. For instance, respective data sets can be at least read by the second peer-to-peer module 366, 368. E.g. based on current system status parameter(s), the SDN application 364.1, 364.2 can create at least one network application requirement data set of the respective SDN application 364.1, 364.2. By means of the second peer-to-peer module 366, 368 the at least one network application requirement data set can be provided to the peer-to-peer application 334 e.g. by writing said at least one network application requirement data set into the peer-to-peer application 334. Then e.g. the controlling means 336 can cause the adaption of one or more configuration data set(s) based on one or more network application requirement data set(s) of one or more SDN application(s) 364.1, 364.2.

Figure 4:
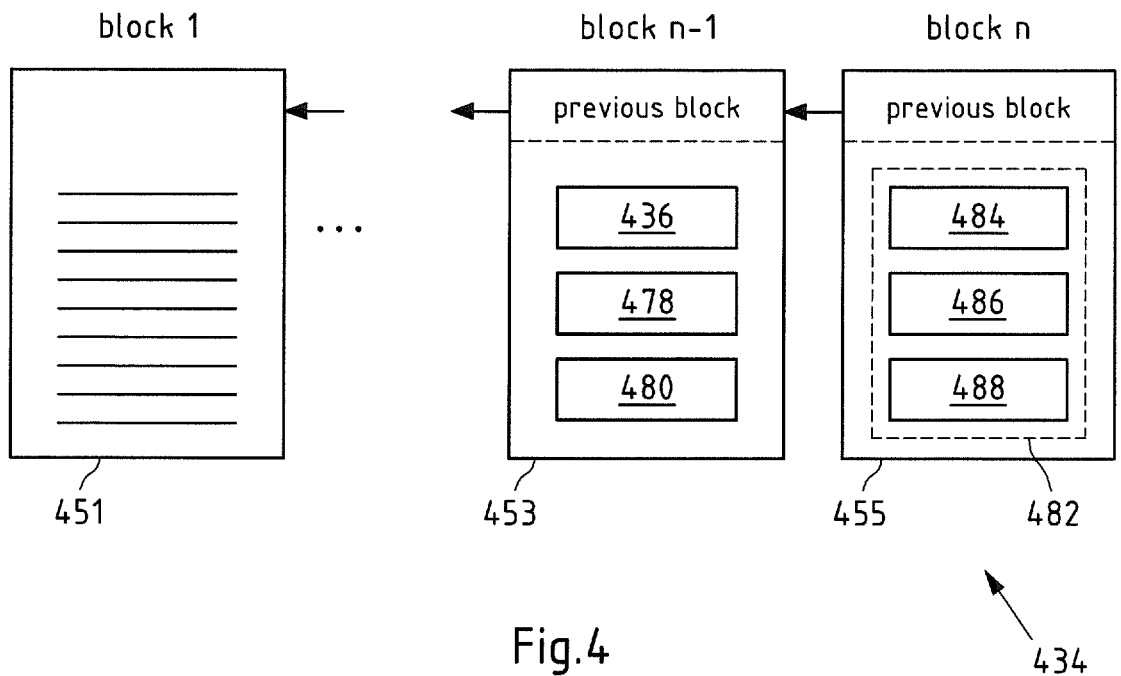
FIG. 4 shows a schematic view of an embodiment of a peer-to-peer application according to the present invention.

FIG. 4 shows a schematic view of an embodiment of a peer-to-peer application 434 according to the present invention.

The depicted peer-to-peer application 434 is a register readable, in particular, by the participants of the peer-to-peer network. Thereby, data e.g. in form of messages can be written and/or read into/from the register 434 by a peer-to-peer module, such as the previously described first peer-to-peer module of a network device and/or the second peer-to-peer module of a SDN application and/or any other participants in the peer-to-peer network. In a preferred embodiment, the peer-to-peer application 434 may be a block chain 434.

Hereinafter, it is assumed in the following description of the present embodiment, that the at least one peer-to-peer application 434 is a block chain 434. However, the following remarks can be easily transferred to other peer-to-peer applications, such as a Directed Acyclic Graph (DAG). A directed acyclic graph, such as IOTA or Tangle, means that blocks (or nodes of the graph) are coupled to each other via directed edges. Thereby, direct means that the (all) edges have (always) a same direction similar to time. In other words, it is not possible to step back. Eventually, acyclic means that loops do not exist.

In a further embodiment of the peer-to-peer application, the block chain can be a permissionless or permissioned block chain. In a specific case the block chain can be public, consortium or private block chain.

In a further embodiment, the peer-to-peer application can be formed with multiple block chains which are connected via mechanisms, such as side chains or smart contracts. Interoperability among block chains can be established.

The block chain 434 is formed by at least one block 451, 453, 455, preferably by a plurality of interconnected blocks 451, 453, 455. The first block 451 may also be called genesis block 451. As can be seen, a block 453, 455 (except for the first block 451) refers to each previous block 451, 453. A new block can be created by a computationally intensive process (for example, so called "mining" or through another appropriate process, such as voting) and will be particularly provided to all participants of the peer-to-peer network.

The present block chain 434 is particularly adapted to receive messages, such as messages comprising system status data set(s), network application requirement data set(s), etc., from a peer-to-peer module of a previously described network device, SDN application or from another peer-to-peer device/entity of another participant of the peer-to-peer network. Further, the block chain 434 is particularly adapted to save these messages in the block chain 434. Furthermore, the block chain 434 is configured to generate messages e.g. based on an evaluation process, controlling process and/or caused by a peer-to-peer module and/or the execution of code of the controlling means 436. In particular, the block chain is at least configured to control and manage a SDN system.

In particular, a (newly) received message can be saved and published in the current block 455 of the block chain 434. Due to the configuration of a block chain 434 as a public register 434, said data message of e.g. a peer-to-peer module of a network device or SDN application can be read by preferably all participants of the peer-to-peer network and/or data of the message may be stored on a decentral file service or distributed block chain database.

As already described, in the present block chain 434 different types of messages and data sets, respectively, for example, within a smart contract (algorithm and/or storage at the block chain 434) can be processed and/or stored. In the present example, the block chain 434 comprises a controlling means 436 in form of a smart contract 436. As previously described, the controlling means 436 may be configured to manage a SDN network, and may e.g. provide one or more configuration data set(s) to one or more network devices.

Furthermore, in the block chain 434 one or more SDN application(s) 478 may be stored. Such a SDN application 478 may be stored in form of a smart contract. Moreover, a block chain 434 may comprise a registering means configured to register a (new) network device and/or SDN application in the block chain 434 as a smart asset.

As can be further seen, the present application comprises a registering means 480 and at least one permission means 482. Preferably, one or more permission(s) 484, one or more identifier(s) 486 and/or one or more account(s) 488 may be stored in the block chain 434. These data can be accessed by network device(s) and/or SDN application(s) in order to verify whether a user, device or the like has access rights for a specific resource. This information can be transformed into networking logic and provided as access control list(s) for the network device(s) and/or as virtual network configurations.

Furthermore, in the block chain 434 decentral storage or database entities, (on-chain or off-chain) evaluating means, algorithms, performance or security configuration data sets may be registered in the registration means 480. Machine learning and/or artificial intelligence algorithms and/or performance and/or security configurations may be registered in the registration mean on the block chain including reputation scores.

Figure 5:
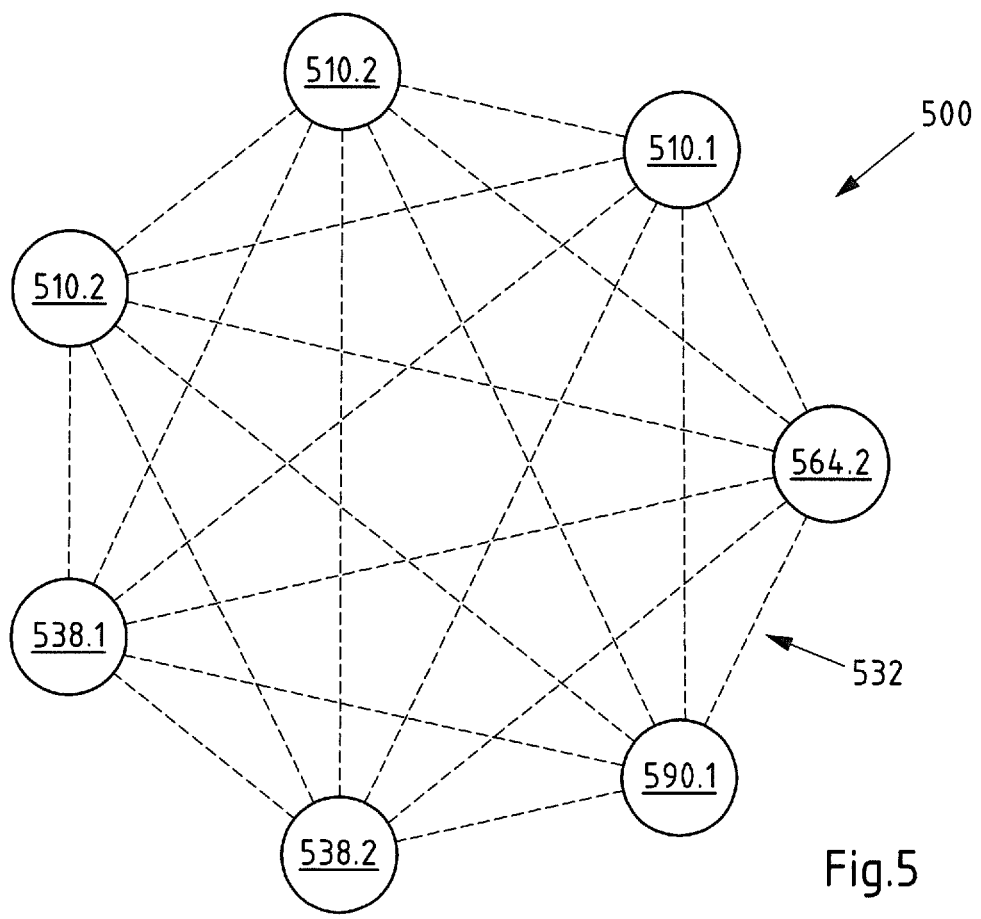
FIG. 5 shows a schematic view of a further embodiment of a system according to the present invention.

FIG. 5 shows a schematic view of another embodiment of a system 500 of the invention. In the present embodiment, only nodes and participants 510.1, 510.2, 538.1, 538.2, 564.2, 590.1 of the peer-to-peer network 534 are shown. In the present example, it is assumed that all nodes 510.1, 510.2, 538.1, 538.2, 564.2, 590.1 comprise the peer-to-peer application (not shown).

The nodes 510.1, 510.2 may be first peer-to-peer modules of network devices. The node 564.2 may be realized by a second peer-to-peer module of a SDN application. Nodes 538.1, 538.2 and 590.1 may be other nodes which are not a network device and/or SDN application. It shall be understood that nodes can be full, remote or light nodes.

As can be seen, two different types of peers or node computers 510.1, 538.1, 590.1 and 510.2, 538.2, 564.2 are presently illustrated. All peers 510.1, 538.1, 590.1 and 510.2, 538.2, 564.2 are comprised by the peer-to-peer network 534. In the present embodiment, however, only a part of the peers 510.1, 538.1, 590.1, 510.2, 538.2, 564.2 in the present case, the peers 510.1, 538.1, 590.1, check the validity of e.g. a managing or controlling process, an evaluation process and/or further data stored in the peer-to-peer application messages, such as agreements, system status messages, and the like.

Furthermore, only a part of the entire peers can be configured to store the peer-to-peer application and/or only a part of the peers can be configured to execute the algorithms of a smart/private contract. Since the validation/verification of e.g. identification data requires a considerable computational effort, it may be advantageous for reasons of efficiency, if only a part of the peers 510.1, 538.1, 590.1, especially particularly powerful peers 510.1, 538.1, 590.1, perform the validation and/or controlling algorithms.

In addition, one or more peer(s) can serve a special purpose such as a configuration management terminal or a network management control room terminal. A configuration management terminal may provide an API to a network configuration front-end in order to manage and maintain network configuration parameters. A network management control room terminal may have an API to a network status visualization for network management purposes. Network topology, device failures, performance data or security data might be visualized and control parameter may be influenced by a network management entity.

Validation, evaluation and optimization can be done on-chain or off-chain, as described hereinbefore. Off-chain validation, evaluation and/or optimization can be managed by the peer-to-peer application, like the code on the block chain. Powerful means, in particular, a high computing power. In other words, in the present case a valid entry in the peer-to-peer application, such as a block chain, is assumed if (only) a part of the peers 510.1, 538.1, 590.1 comes to a positive result. It shall be understood that only a single, especially particularly powerful peer can perform the validation, evaluation and/or optimization process.

Similarly, in an alternative (not shown) embodiment, a particularly large peer-to-peer network may be divided in two or more clusters. In a corresponding peer-to-peer network, for example, a validation will only be carried out by the members of one cluster (e.g. sharing of a block chain to improve the scalability). In a further embodiment, the peer-to-peer application can be formed using multiple block chains. These block chains are connected via frameworks such as sidechains.

Figure 6:
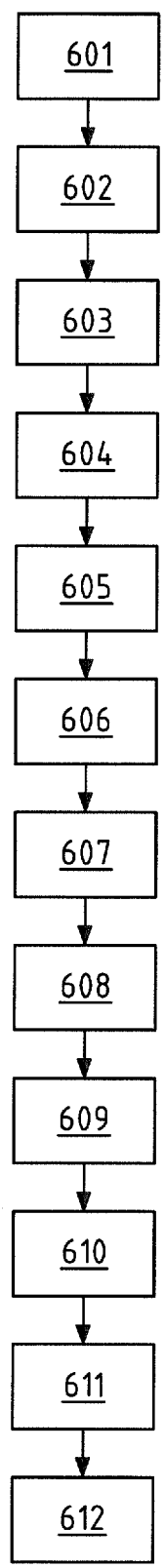
FIG. 6 shows a diagram of an embodiment of a method according to the present invention.

FIG. 6 shows a diagram of an embodiment of a method according to the present invention. The depicted method for managing and operating, in particular, a SDN system or network, respectively, comprises a lot of optional steps. Further, it is noted that the order of the steps can be changed and/or steps can be conducted in parallel to each other. In particular, a previously described communications system, such as the communications system of FIG. 3, can be operated with the subsequently described method.

In a step 601, at least one network device can monitor, e.g. by means of one or more monitoring unit(s), e.g. the data traffic routed and/or switched by the data forwarding unit of the network device. It shall be understood that further system parameters e.g. relating to security aspects, bandwidth allocation aspects, user access, etc., can be monitored.

The monitored system status parameter can be transmitted to the peer-to-peer application via the first peer-to-peer module of the network device (step 602). Each system status data set can be provided with the peer-to-peer identifier of the sending first peer-to-peer module and associated network device, respectively. In addition, each system status data set can be signed by the sending first peer-to-peer module. Then, each system status data set received by the peer-to-peer application can be validated by at least a part of the nodes of the peer-to-peer network (step 603) prior to further processing said data set.

Only in the case the validation result is positive, said received system status data set can be further processed and/or forwarded by the peer-to-peer application, such as by means of the controlling means of the peer-to-peer application, in step 604. For instance, the system status data set can be forwarded to a distributed data storage configured to store the data and/or to one or more SDN application(s). Alternatively or additionally, the controlling means may be configured to forward the one or more (validated) system status data set(s) to one or more evaluating means, such as the previously described off-chain evaluating means.

Then the evaluating means can evaluate the received one or more system status data set(s) of one or more network devices. For instance, the data traffic can be analyzed. Analyzing may mean that bottleneck(s) of the data traffic can be identified. The one or more identified bottleneck(s) of the data traffic can be provided to the peer-to-peer application as an evaluation result. In addition, the evaluation result can include adapted configuration data which can be used to at least reduce the number of identified bottleneck(s). For instance, based on the identified bottleneck(s) of the data traffic routing and/or switching parameter(s) of one or more configuration data set(s) for one or more network device(s) can be adapted. The evaluating process can be validated by at least a part of the nodes of the peer-to-peer network. Security and quality of evaluating processes and their results can be further improved.

In a next step 605, at least one adapted configuration data set can be provided to the at least one respective network device by means of the peer-to-peer application, in particular, the controlling means. By way of example, the adapted configuration data set can be stored in the peer-to-peer application together with e.g. an identifier of the related network device. Then, the first peer-to-peer module of the related network device can inspect the public peer-to-peer application in order to read out the configuration data set related to the network device of the first peer-to-peer module. Alternatively or additionally, the controlling means can cause the transmission of one or more messages comprising the adapted configuration data to the at least one first peer-to-peer module of the respective network device.

Then, the at least one data forwarding unit of the network device can be operated in accordance with the adapted configuration data set (step 606). For instance, specific data packet(s) may be forwarded or routed to one or more other network device(s) e.g. in order to reduce at least one data traffic bottleneck. The adapted configuration data set can be preferably stored in a local and secure storage of the network device.

In a similar way, it is possible to adapt further configuration data sets, such as data processing configuration data sets. Then, at least one data processing unit can be operated in accordance with the at least one data processing configuration data set.

Furthermore, in step 607, a second peer-to-peer module of a SDN application can provide at least one network application requirement data set of the respective SDN application to the peer-to-peer application, in particular, the controlling means of the peer-to-peer application. The second peer-to-peer module may provide said data set with a peer-to-peer identifier of the SDN application and/or with a signature. The received network application requirement data set can be validated by at least a part of the nodes of the peer-to-peer network prior to further processing said data set (step 608). After a positive validation, in step 609, the controlling means may cause the adaption of one or more configuration data set (s) based on the at least one network application requirement data set.

Then, in step 610 (similar to step 605), the configuration data set at least one adapted configuration data set can be provided to at least one network device and the at least one network device can be operated in accordance with the adapted configuration data set in step 611 (similar to step 606). In a further step 612, the peer-to-peer application may provide system status data to the one or more SND application(s). For instance, the respective second peer-to-peer module(s) can read out said data from the peer-to-peer application e.g. in order to adapt a respective network application requirement data set.

As previously noted, several steps can be conducted at least partly in parallel to each other and/or can be combined to one step (such as steps 605 and 610 or 606 and 611).

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A communications system, in particular, a software defined networking communications system, comprising:
   at least one network device comprising at least one data forwarding unit configured to forward at least one data packet,
   wherein the network device comprises at least one first peer-to-peer module,
   wherein the first peer-to-peer module is configured to communicate with at least one peer-to-peer application of at least one peer-to-peer network,
   wherein the at least one peer-to-peer application comprises at least one controlling means configured to manage at least the network device by providing configuration data sets to the first peer-to-peer module comprising routing and security parameters,
   wherein the network device further comprises at least one data storage unit configured to store the provided configuration data sets,
   wherein the at least one peer-to-peer application is a decentral register configured to store computer code acting as the controlling means,
   wherein the code is processed by computer nodes of the at least one peer-to-peer network, and
   wherein the controlling means further comprises means for receiving and evaluating system status data sets and, based on the evaluation results, managing the network device.

2. The communications system according to claim 1, wherein at least the data forwarding unit is operated in accordance with the stored configuration data set.

3. The communications system according to claim 2, wherein the data storage unit is formed by at least one of a protected software container or a trusted execution environment.

4. The communications system according to claim 1, wherein —the communications system comprises at least one off-chain computation entity with at least one evaluating means, —wherein the off-chain computation entity is not part of the peer-to-peer application itself, and —wherein controlling means is configured to forward the received status data set to the evaluating means.

5. The communications system according to claim 1, wherein
   the communications system comprises at least one software defined networking application, wherein:
   the software defined networking application comprises at least one second peer-to-peer module, or
   the software defined networking application is stored in the peer-to-peer application.

6. The communications system according to claim 1, wherein —the communications system comprises at least one distributed data storage configured to store at least the configuration data set, —wherein the controlling means is configured to access the distributed data storage for providing at least the configuration data set to the network device.

7. The communications system according to claim 1, wherein
   the peer-to-peer application comprises at least one registration means configured to at least one of receive a registering message of a first peer-to-peer module of a network device or receive a registering message of a second peer-to-peer module of a software defined networking application,
   wherein the registration means is configured to at least one of register the network device by storing a unique peer-to-peer identifier of the network device or register the software defined networking application by storing a unique peer-to-peer identifier of the software defined networking application.

8. The communications system according to claim 1, wherein the peer-to-peer application comprises at least one permission means configured to store at least data for at least one permission list.

9. The communications system according to claim 1, wherein
   the controlling means is formed as a virtualization network function controlling means configured to manage at least one network functions virtualization infrastructure,
   wherein the network functions virtualization infrastructure comprises at least one of:
   computing hardware unit,
   storage hardware unit,
   network hardware,
   virtual computing unit,
   virtual storage unit,
   virtual network.

10. The communications system according to claim 1, wherein the at least one peer-to-peer application is configured to store data with given proofs or signatures or crypto conditions.

11. The communications system according to claim 1, wherein the at least one peer-to-peer application is a block chain or decentral ledger comprising at least two blocks coupled to each other.

12. The communications system according to claim 1, wherein at least a part of the computer nodes, participants of the at least one peer-to-peer network, or both at least part of the computer nodes and participants of the at least one peer-to-peer network are configured to validate at least one message received and/or generated by the peer-to-peer application.

* * * * *